(12) United States Patent
Alrabady

(10) Patent No.: US 7,623,875 B2
(45) Date of Patent: Nov. 24, 2009

(54) SYSTEM AND METHOD FOR PREVENTING UNAUTHORIZED WIRELESS COMMUNICATIONS WHICH ATTEMPT TO PROVIDE INPUT TO OR ELICIT OUTPUT FROM A MOBILE DEVICE

(75) Inventor: Ansaf I. Alrabady, Livonia, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 506 days.

(21) Appl. No.: 11/409,680

(22) Filed: Apr. 24, 2006

(65) Prior Publication Data
US 2007/0247288 A1    Oct. 25, 2007

(51) Int. Cl.
H04W 24/00 (2009.01)
H04M 1/665 (2006.01)
B60R 25/00 (2006.01)
B60R 25/10 (2006.01)

(52) U.S. Cl. .......... 455/456.4; 455/410; 455/411; 340/425.5; 340/426.1; 340/426.16

(58) Field of Classification Search ............ 455/456.4, 455/410–411
See application file for complete search history.

(56) References Cited

U.S. PATENT DOCUMENTS

| 4,144,409 | A | * | 3/1979 | Utano et al. | 455/411 |
|---|---|---|---|---|---|
| 5,729,537 | A | * | 3/1998 | Billstrom | 455/411 |
| 5,774,550 | A | * | 6/1998 | Brinkmeyer et al. | 340/5.7 |
| 7,323,991 | B1 | * | 1/2008 | Eckert et al. | 340/5.7 |
| 2003/0073406 | A1 | * | 4/2003 | Benjamin et al. | 455/456 |
| 2003/0103482 | A1 | * | 6/2003 | Van Bosch | 370/338 |
| 2004/0068653 | A1 | * | 4/2004 | Fascenda | 713/168 |
| 2005/0213519 | A1 | * | 9/2005 | Relan et al. | 370/277 |
| 2007/0223424 | A1 | * | 9/2007 | Su et al. | 370/335 |

FOREIGN PATENT DOCUMENTS

WO    WO 9927746 A1 *  6/1999

* cited by examiner

*Primary Examiner*—Nick Corsaro
*Assistant Examiner*—Tangela T. Chambers

(57) ABSTRACT

A monitoring system and method for controlling access to, and especially protecting against unauthorized requests to provide input to, e.g., program, or elicit output from, a vehicular or other mobile device, such as an electronic control unit (ECU), adapted for use with the system, wherein said system, in a preferred embodiment, is configured to receive the request within a safe-zone, block its execution by the vehicle, send an objection message back to the source, and send a report to a law enforcement agency, based on the location of the source of the request.

13 Claims, 5 Drawing Sheets

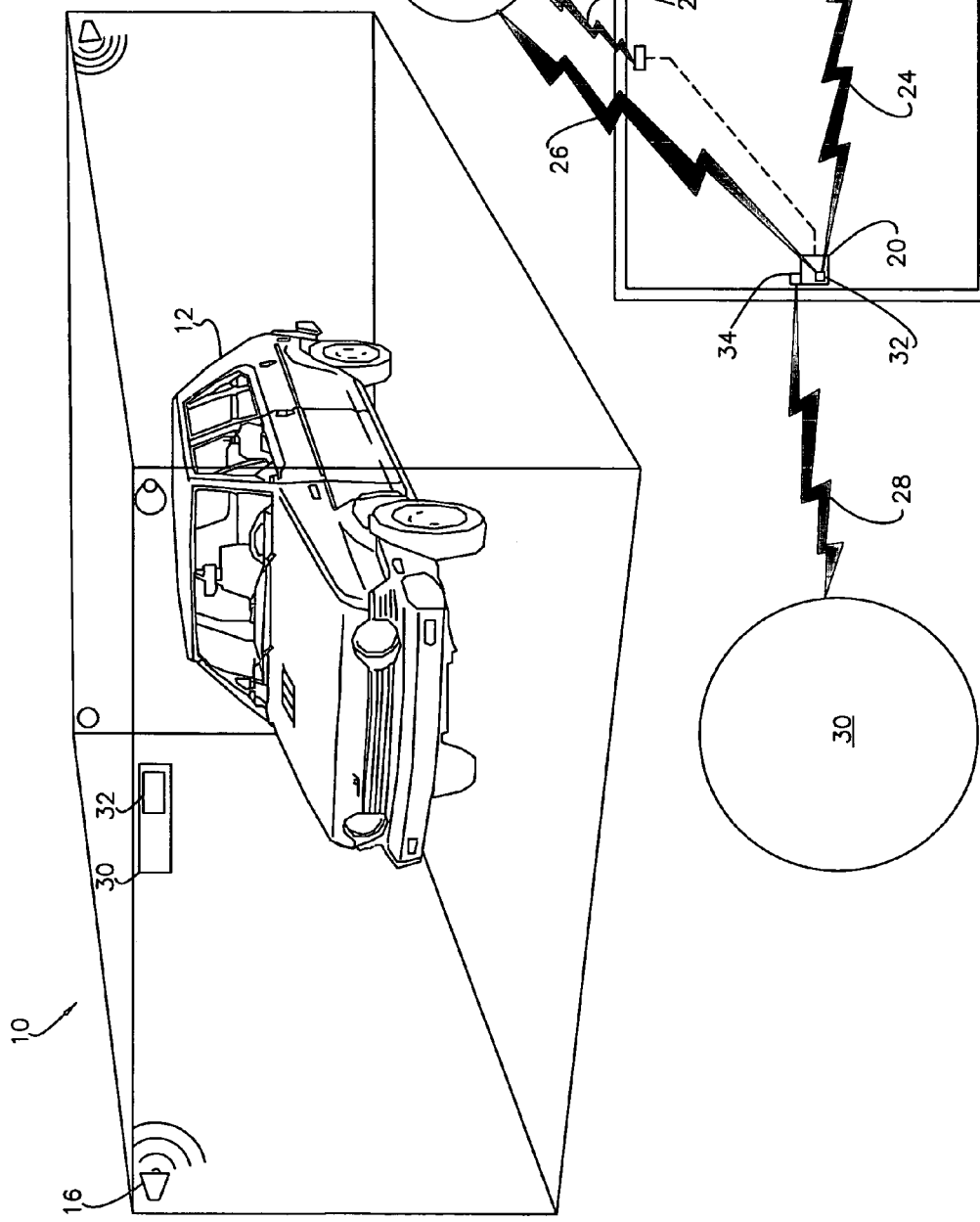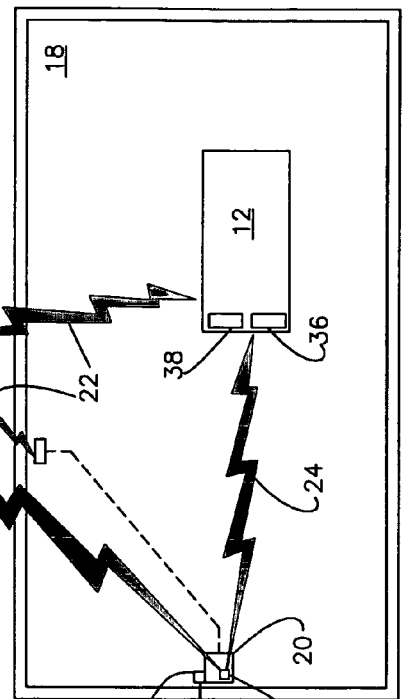

SYSTEM AND METHOD FOR PREVENTING UNAUTHORIZED WIRELESS COMMUNICATIONS WHICH ATTEMPT TO PROVIDE INPUT TO OR ELICIT OUTPUT FROM A MOBILE DEVICE

TECHNICAL FIELD

The present invention relates to systems and methods for controlling access to vehicular or other mobile devices. More specifically, the present invention concerns a system and method for controlling access to, and especially protecting against unauthorized attempts to provide input to, e.g., program, or elicit output from, a vehicular or other mobile device, such as an electronic control unit, wherein at least one monitoring device is configured to determine an outside-originating communication.

BACKGROUND OF THE INVENTION

In the prior art, programming a vehicular electronic control unit (ECU) requires that the vehicle be present at an authorized location (e.g., a manufacturing or assembly facility, a dealership, or an authorized repair facility) and directly hard-wired to a programming tool. Recently, remote wireless programming of ECUs has been developed to allow greater programming flexibility. With this change, security has shifted from physical mechanisms to password, gateway, and cryptographic authentication mechanisms for controlling access. Unfortunately, the security afforded by these wireless access-control algorithms does not provide a sufficiently high level of assurance against malicious attacks, such as, for example, the communication of viruses or other harmful or undesired programs to ECUs. Where a malicious communicator has access to the password or cryptographic key, and the gateway provisions are true (e.g. the vehicle or device is at an authorized location), the communication will be accepted.

It will be appreciated that this concern extends to programming (e.g. corruption), providing input to (e.g. virus downloading), or eliciting output from (e.g. theft, spying, etc.) vehicular ECUs or other mobile devices, including, for example, mobile telephones and mobile computing devices. As telematic applications, and wireless communication capability among devices become increasingly prevalent, the ability to discern an authorized communication becomes increasingly significant. Toll booths or parking garages, for example, might be adapted to wirelessly query vehicles for identification or even for payment information, but, as mentioned, password and cryptographic mechanisms do not afford sufficient security against the illicit collection of such information.

Thus, an improved system and method of controlling access to a vehicular ECU or mobile device is needed.

SUMMARY OF THE INVENTION

The present invention provides a monitoring system and method for controlling access to, and especially protecting against unauthorized attempts to provide input to, e.g., program, or elicit output from, a vehicle or other mobile device, such as an ECU. The system is useful, among other things for providing an added layer of security, when used in conjunction with password, cryptographic, or gateway mechanisms, by preventing communication between the target and an originating source outside of a predetermined authorization zone.

A first aspect of the present invention concerns a method of controlling access to a mobile device within an authorized zone having a communications network. A preferred embodiment of the method includes the steps of determining and storing a list of the node addresses of the network, detecting a wireless request within the zone, comparing the address of the source of the request to the addresses in the list, and blocking delivery of the request to the mobile device, when the originating source address is not found in the list.

A second aspect of the present invention concerns a method of controlling access to a mobile device within an authorized zone. The method comprises the steps of determining the presence of the mobile device within the zone, determining and storing at least one communication channel of the mobile device, detecting a wireless request within the zone, and determining the transmission channel of the request, comparing the transmission channel to the communication channel of the mobile device, determining the location of the originating source of the request, when the transmission channel is congruent to the communication channel, and denying acceptance of the request by the mobile device, if the originating source is located outside of the zone.

A preferred embodiment of the system includes at least one receiver oriented and configured to detect a wireless request within the zone, a controller, and at least one transmitter communicatively coupled to said at least one receiver and mobile device. In another aspect of the invention, the system and method is configured to detect only requests having transmission channels congruent to the communication channel of the mobile device.

It is appreciated that the system and method may be used in conjunction with one or more other independent access-control mechanisms, such as a physical, password, or cryptographic authentication mechanisms, which may be encountered and must be satisfied either or both before or after the functional steps of the present invention are performed in order to gain access to a device.

These and other features of the present invention are discussed in greater detail in the section below titled DESCRIPTION OF THE PREFERRED EMBODIMENT(S).

BRIEF DESCRIPTION OF THE DRAWINGS

A preferred embodiment of the present invention is described in detail below with reference to the attached drawing figures, wherein:

FIG. 1 is a perspective view of a monitoring system in accordance with a preferred embodiment of the present invention;

FIG. 1a is a plan view of the system shown in FIG. 1, particularly illustrating the communications between the entities;

DESCRIPTION OF THE PREFERRED EMBODIMENT(S)

Figure 2:
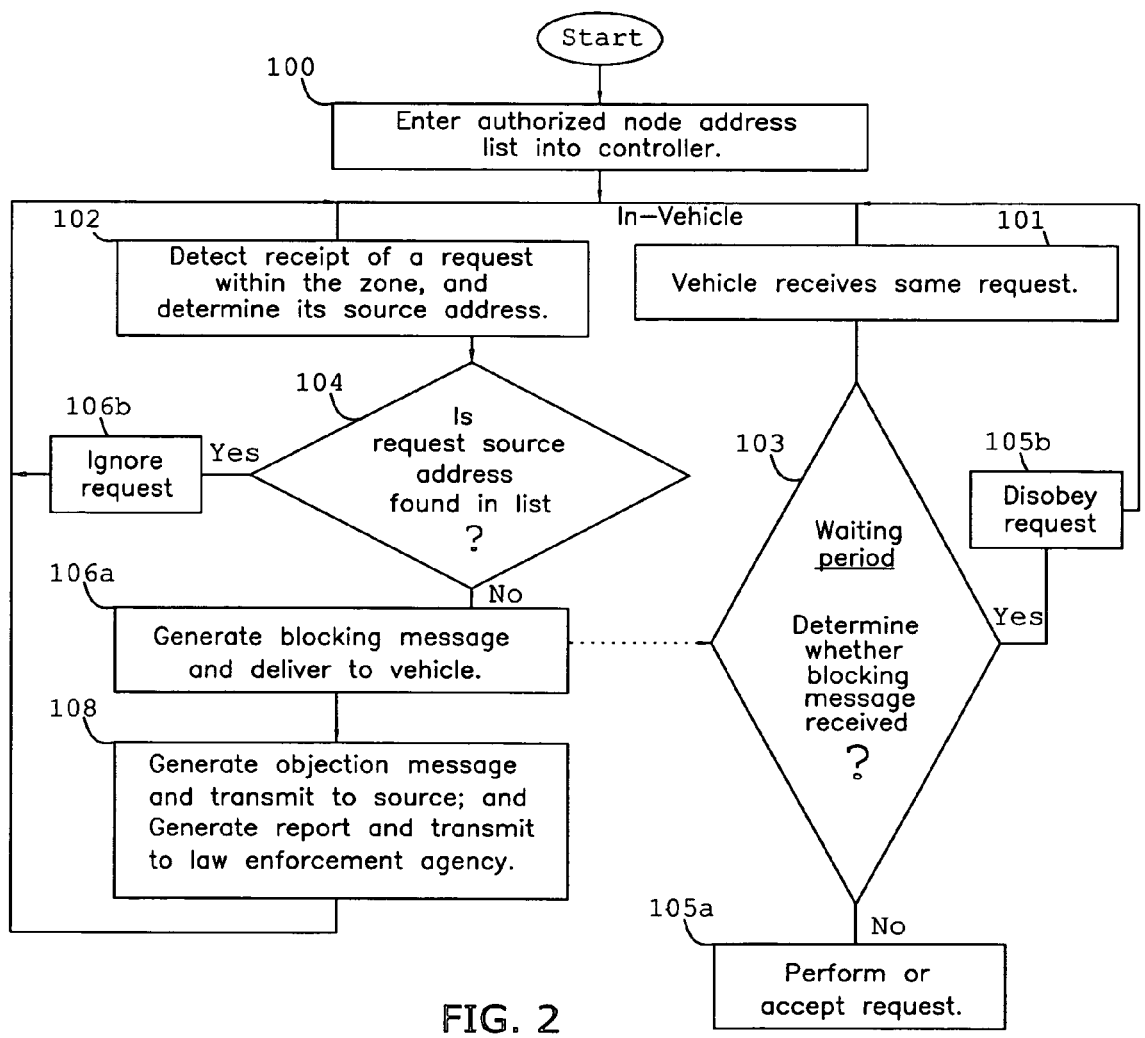
FIG. 2 is a schematic flow diagram of a preferred method of operation of a first preferred embodiment of the system.

With reference to the figures, a system and method is herein described and otherwise disclosed in accordance with a preferred embodiment of the present invention. Broadly, the present invention concerns a system and method for controlling telematic access to, and especially protecting against unauthorized attempts to provide input to or elicit output from, a vehicular or other mobile device. In a preferred embodiment, protection against unauthorized attempts are determined by the location of the originating request source. The invention provides a basis or an additional basis for allowing or denying the attempt at access. Though described hereafter in terms of a vehicular device located onboard or otherwise associated with a vehicle, it should be understood that the present invention can be used to control access to substantially any mobile device, such as a mobile telephone or a mobile computing device (e.g., laptop, notebook, personal digital assistant).

In general, the present invention provides a monitoring system 10 and a method of using source location to deny telematic access to a vehicle 12, such as a car or truck, adapted for use with the system 10 (see, FIG. 1). The determined location of a requesting source 14 provides a basis for denying or accepting the attempt at access. Preferably, the monitoring system 10 of the present invention is used to supplement one or more other independent access-control mechanisms, such as physical, password, or cryptographic authentication mechanisms, rather than as a stand-alone alternative to those mechanisms. For example, accessing a particular device may require both that the party attempting to access the device provide a correct password and that the mobile device and party attempting to access the device are located at an authorized location, such as, e.g., a manufacturing or assembly facility, dealership, toll booth, or authorized repair facility.

Referring to FIGS. 1 and 1a, a first preferred embodiment of the system 10 includes at least one receiver 16 positioned, oriented and/or configured, so as to define a safe zone 18, wherein requests are detected by the receiver(s) 16, and the zone 18 is based upon the receptive range of the receiver 16. More preferably, a plurality of receivers 16 are positioned and cooperatively configured to present an overlapping zone 18 that redundantly encompasses at least a portion of the area for which protection is sought. As shown in FIGS. 1 and 1a, the zone 18 may be further defined by physical structures such as walls, wherein the receivers 16 are configured to receive and protect against only communications entering the indoor spaces defined by these walls. It is appreciated, that this configuration limits interference within the system 10 and reduces unnecessary processing of exclusively exterior-zone communications.

The preferred receivers 16 are selected and/or configured so as to be able to receive a wide range of telematic communication channels within the zone 18, and in doing so, may be identical or present various configurations. For example, the system 10 may comprise receivers 16 operable to receive radio frequency (RF), cellular or other technology based communications, and each may be configured to receive a different range of communication channels. In a preferred embodiment, the receivers 16 detect all short-range communications within the zone 18, and are cooperatively configured with a controller 20 to determine and block those communications or requests 22 that originate outside of the zone 18, irrespective of their channel. More preferably, in this preferred embodiment, the controller 20 is communicatively coupled to the authorized communication network (not shown) within the zone 18, and may be hard-wired or wirelessly coupled to the network, such that a request 22 emanating from an authorized node within the network is autonomously determinable by the controller 20.

More particularly, in this configuration, the system 10 is configured to determine network activity, i.e. whether a network transmitter has transmitted a request, within the period of potential promulgation of the request 22. If the system 10 detects network activity during the period of potential promulgation, it assumes that the request 22 emanated from the network, and therefore ignores the request 22. It is appreciated that the period of potential promulgation of a wireless communication is readily determinable by one ordinarily skilled in the art, and that this period varies according to the communication technology. As such a temporal range for this period is not provided herein with the understanding that the preferred system 10 operates in real-time, i.e. without undue delay, so as to effectively block unauthorized requests.

Alternatively, where the system 10 is configured to determine the address of a detected request 22, a list of the approved communication node addresses within the network may be manually inputted into or otherwise determined by the controller 20. The controller 20 is further configured to compare the source address of a detected request 22 to the list, and cause the request 22 to be blocked, if the source address is not found in the list.

It is also within the ambit of the present invention to manually enter addresses from one or more outside authorized zones (not shown) into the system 10, so that requests therefrom are also not blocked. The entries in the authorized zone database may be categorized with respect to the type of access for which each such location entry is authorized. Thus, for example, the location of a repair facility or dealership may be an authorized location for programming an ECU and for eliciting identification information but not for eliciting other information, thereby allowing a later received but paid for software update to be transmitted to a customer's vehicle at his or her residential garage.

Under either configuration, the preferred controller 20 is also configured to cause to be sent an objection message 26 back to the source 14, if the request 22 is deemed unauthorized. To prevent repeated unintentional communication attempts, the objection message may include indicia readable by a user at the source location, such as "UNAUTHORIZED COMMUNICATION ATTEMPTED." More preferably, the controller 20 is further configured to cause to be sent a report 28 of the unauthorized request to a law enforcement agency 30, wherein the report 28 identifies the source 14 and the nature of the unauthorized communication attempt. Thus, the controller 20 is preferably communicatively coupled to a short-range transmitter 32 (for communicating back to the source 14), and long-range or cellular communication device 34 (for communicating to the agency 30). The period necessary to determine the authorization status of the request 22, and communicate the blocking message 24 to the device 12, shall be referred to as the "period of manipulation."

Thus, a preferred method of operation begins at a step 100, wherein an authorized node address list is entered into the controller 20 (see FIG. 2). At a step 102, the receivers 16 detect a request 22 within the zone 18. At a step 104, the controller 20 determines whether the request 22 originated from within or outside of the zone 18, by comparing its source address with the authorized list. If disseminated from a source having an address not included within the list, then the controller 20 causes the request 22 to be blocked at a step 106a, and may then return to step 102 in order to continue monitoring. More preferably, at step 106a, the controller 20 broadcasts or otherwise sends to each mobile device or vehicle 12 within the zone a blocking message 24, which instructs the vehicle 12 to disobey the unauthorized request 22.

The device or vehicle 12 is, therefore, adapted for use with the system 10, and further includes a communication device 36 that is communicatively coupled to the transmitter 32 of the monitoring system 10. The in-vehicle communication device 36 is configured to receive data transmissions from the system 10, and also to receive the request 22 contemporaneously with the receivers 16. An in-vehicle ECU 38 is communicatively coupled to the vehicle communication device 36 and configured to sequentially receive the request 22, wait a predetermined period not less than the period of manipulation, and conditionally perform or accept the requested action, if a blocking message 24 is not received or detected during the waiting period. As such, the vehicle 12 further includes suitable hardware, software, firmware, or combination thereof, to perform the intended functions.

Figure 2A:
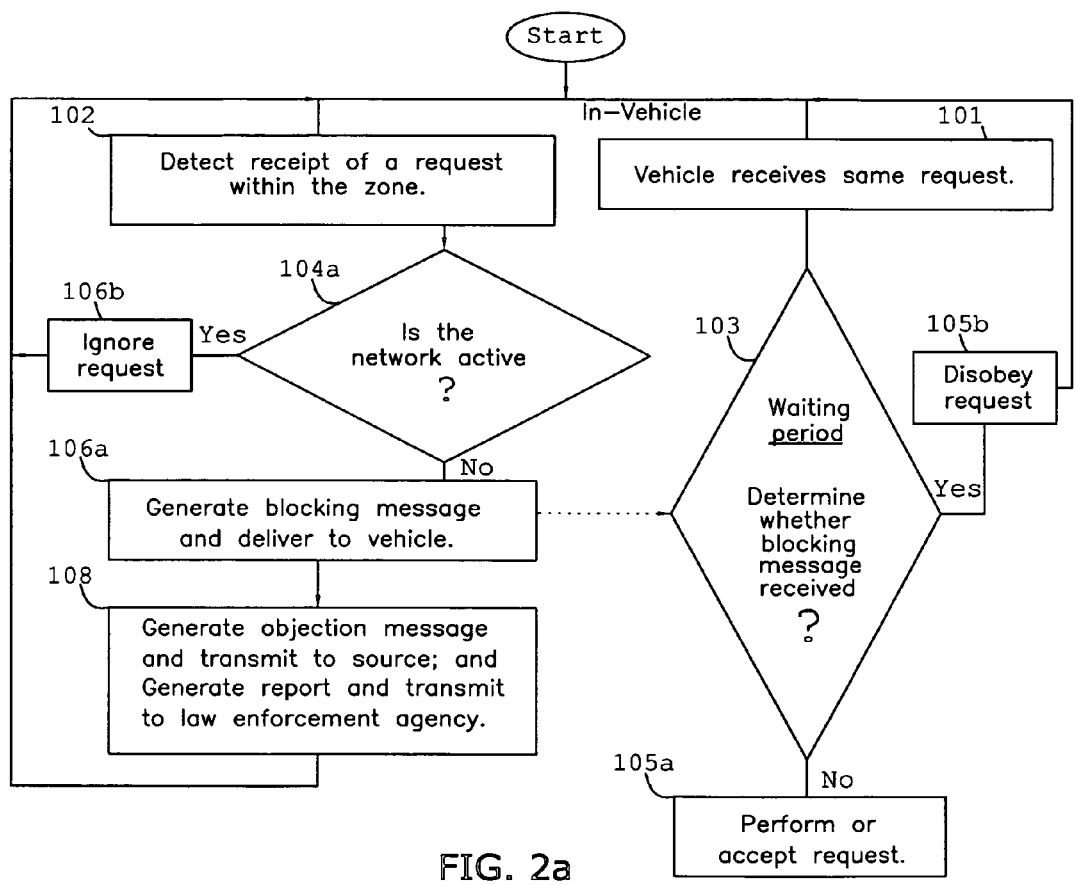
FIG. 2a is a schematic flow diagram of an alternative of the operation described in FIG. 2.

In the alternative where the controller 20 is hard-wired or otherwise communicatively coupled to the authorized communications network within the zone 18, once a request 22 is received by a receiver 16, and transmitted to the controller 20, the controller 20 determines whether the network has been active during the period of potential promulgation, i.e. a network transmitter is currently transmitting or has recently transmitted a request (see, FIG. 2a modifying FIG. 2 by omitting step 100, and supplanting step 104 with step 104a). As previously mentioned, in this mode of operation, if network activity is not detected during the period of potential promulgation, then the controller 20 causes the request 22 to be blocked at a step 106a, and may then return to step 102 in order to continue monitoring.

More preferably, as shown in FIGS. 2 and 2a, and at a step 108, if the request 22 originates outside the zone 18, the controller 20 further causes an objection message 26 to be sent to the source 14, and a report 28 to be sent to an agency 30, prior to returning to step 102. If the request 22 originates from within the zone 18, then the controller 20 ignores the request 22 at step 106b allowing it to be delivered to the vehicle or mobile device 12, and continues to monitor the zone 18 by returning to step 102. Thus, as shown in FIGS. 2 and 2a, it is appreciated that the vehicle 12 functions to concurrently receive the same request at a step 101; and at a parallel step 103 the vehicle waits to determine whether a blocking message is being delivered to it. If yes, the vehicle 12 is programmably configured to disobey the request at step 105b and returns to step 101 so as to receive a new message; if a blocking message has not been received, the vehicle performs or accepts the request at step 105a.

In a second preferred embodiment of the invention, the receivers 16, controller 20, and short-range transmitter 32 of the system 10, may be further configured to cooperatively determine the presence and communication channel of a mobile device or vehicle 12 within the zone 18, determine the transmission channel of the request 22, and transmit a blocking message 24 to the vehicle 12, only if the transmission channel and communication channel of the request 22 are congruent (i.e. substantially identical, so as to be able to carry the same message) and the source address indicates a source location outside of the authorized zone 18.

The device or vehicle 12, in the second preferred embodiment, is also adapted for use with the system 10, and further includes a communication device 36 that define a communication channel and is communicatively coupled to the transmitter 32 of the monitoring system 10. It is appreciated that this embodiment enables the system 10 to protect against unauthorized requests 22 directed to the mobile device or vehicle 12 channel, but allows short-range communications on other channels to enter the zone 18 without interruption.

Figure 3:
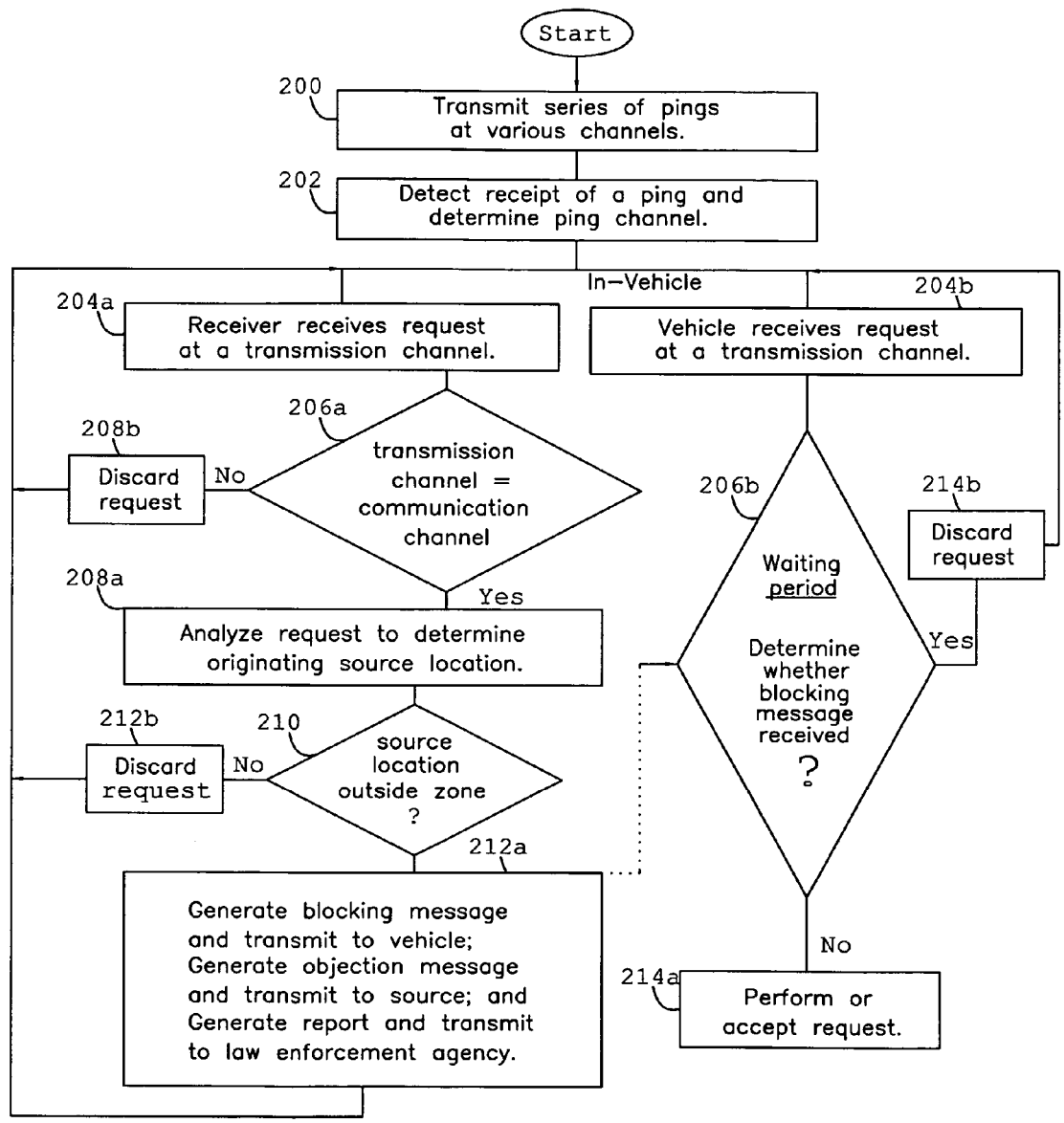
FIG. 3 is a schematic flow diagram of a preferred method of operation of a second preferred embodiment of the system.

A preferred method of operation in the second preferred embodiment is shown in FIG. 3, and illustrates further features and functions of the system 10. The method begins at step 200, wherein the short-range transmitter 32 broadcasts a plurality of pings within the zone 18 at various channels, and each ping is identifiable by its transmitted channel. At a step 202, the receiver 16 detects receipt of at least one ping by a mobile device or vehicle 12 located within the zone 18, and the controller 20 is configured to determine and store the transmitted channel of the received pings. Alternatively, however, and similar to the first preferred embodiment, where a limited number of mobile devices or vehicles constantly present a limited number of communication channels within the zone 18 (e.g. residential garages, wireless office intranets), the monitored communication channels may be manually inputted, and stored, thereby skipping diagnostic steps 200 and 202.

At steps 204a and b, the receiver 16 and vehicle 12 receive a request 22 having a transmission channel. At a step 206a, the controller 20 determines whether the transmission channel is congruent to the communication channel, while the vehicle 12 commences a waiting period at step 206b during which it determines whether a blocking message has been received. At a step 208a, if congruent, the controller 20 analyzes the request 22 to determine its originating source location, otherwise, if the channels are not congruent, and at a step 208b, the request 22 is discarded and the method returns to steps 204a,b. At a step 210, the controller 20 further determines whether the originating source location is within the zone 18. At a step 212a, if the source location is outside the zone 18, the controller 20 generates and causes a blocking message 24 to be transmitted to the vehicle 12. Otherwise, the controller 20 at a step 212b discards the request 22, and returns to steps 204a,b. As shown in FIG. 2, the waiting period at step 206b is of sufficient duration to allow steps 206a through 212a to be performed by the system 10. At a step 214a, if the vehicle 12 receives a blocking message 24 associated with the request 22, it discards its request 22 without performance or acceptance, and the method returns to step 204a,b. Otherwise, at a step 214b, if a blocking message 24 is not received after the waiting period, the vehicle accepts and/or performs the request 22.

More preferably, at step 212a, the controller 20 further generates an objection message 24, and causes the objection message 24 to be communicated to the source 14. Most preferably, in addition to the objection message 26, the controller 20 also generates a report 28, and causes the report 28 to be communicated to a law enforcement agency 30.

Figure 4:
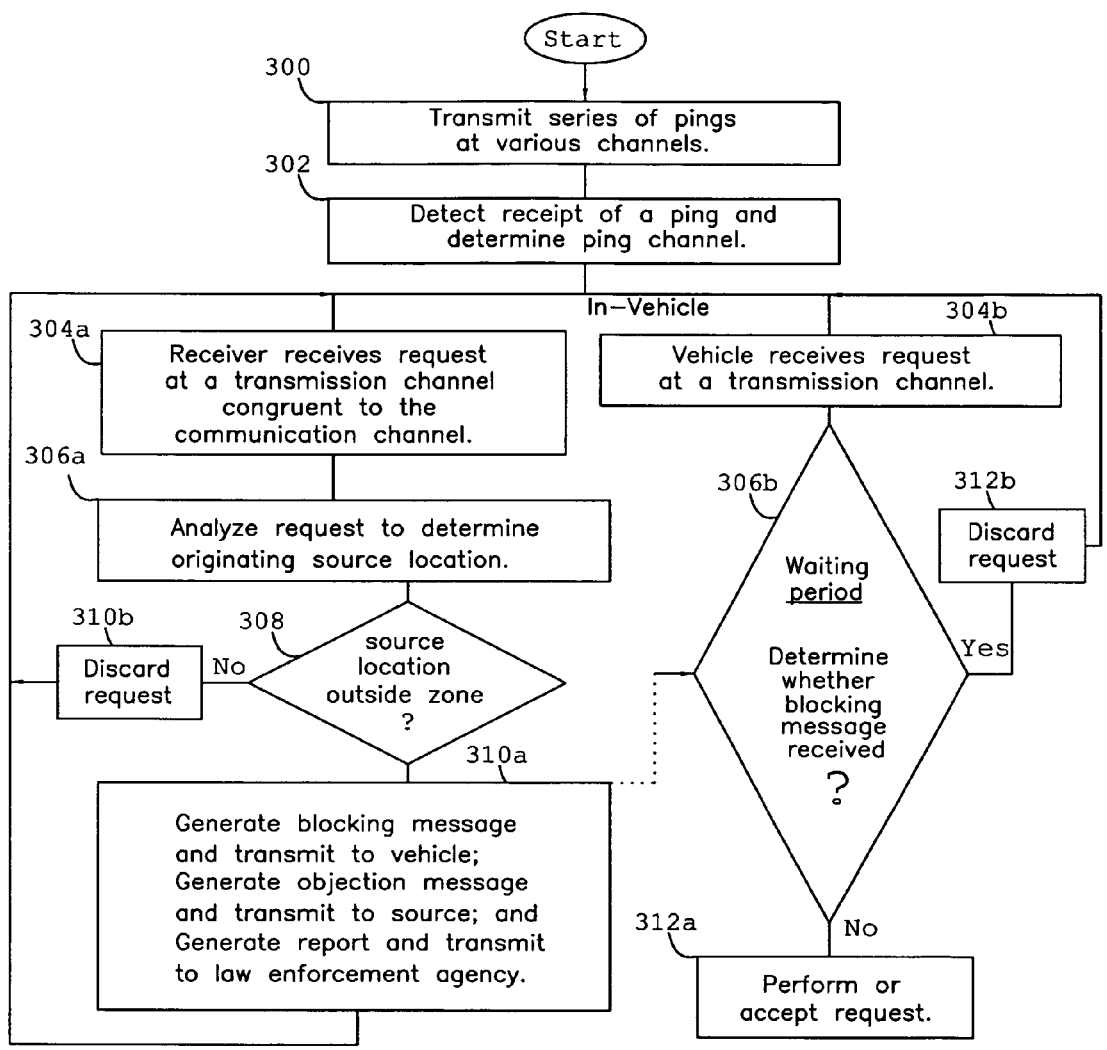
FIG. 4 is a schematic flow diagram of an alternative of the method of operation described in FIG. 3.

A second preferred method of operation of the second embodiment is shown in FIG. 4, wherein the controller 20 and receiver 16 are cooperatively configured to detect only requests having transmission channels congruent with the communication channel of the device or vehicle 12. In this configuration, steps 200 through 214a,b, with the exception of omitted steps 206a, and 208b, are repeated and referred to as steps 300 through 312a,b.

The preferred forms and methods of operation of the invention described above are to be used as illustration only, and should not be utilized in a limiting sense in interpreting the scope of the present invention. Obvious modifications to the exemplary embodiments and modes of operation, as set forth herein, could be readily made by those skilled in the art without departing from the spirit of the present invention. The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A method of controlling performance of a wireless request by a mobile device within an authorized zone having a communications network, wherein said method is autonomously performed by a controller, the method comprising the steps of:
   (a) detecting the request within the zone;
   (b) determining within a period of manipulation whether the request emanated from the network; and
   (c) communicating with the mobile device within the period of manipulation, so as to cause the request to be disobeyed by the device, when the request did not emanate from the network
   wherein steps (b), and (c) further including the steps of communicatively coupling the controller and network, such that the controller is operable to determine a period of potential promulgation for the request, detect network activity within the period of potential promulgation, and cause the request to be disobeyed, when network activity is not detected within the period of promulgation.

2. The method as claimed in claim 1, wherein the mobile device detects the request contemporaneously with the controller, waits a predetermined period at least equal to the period of manipulation, determines whether a blocking message has been received from the controller during the waiting period, obeys the request only if a blocking message has not been received during the waiting period, and step (c) further includes the steps of communicating a blocking message to the mobile device within the period of manipulation, which instructs the mobile device not to obey the request.

3. The method as claimed in claim 1, wherein the mobile device composes a vehicle.

4. The method as claimed in claim 1, step (a) further including the steps of detecting a wireless radio frequency or cellular request.

5. The method as claimed in claim 1, wherein the controller includes at least one receiver oriented and configured to detect a wireless request within the zone, and at least one transmitter communicatively coupled to the device.

6. A method of controlling performance of a wireless request by a mobile device within an authorized zone, the method comprising the steps of:
   (a) determining the presence of the mobile device within the zone;
   (b) determining and storing at least one communication channel of the mobile device;
   (c) detecting the request within the zone, and determining the transmission channel of the request;
   (d) comparing the transmission channel to the communication channel of the mobile device;
   (e) determining the location of the originating source of the request, when the transmission channel is congruent to the communication channel; and
   (f) causing the request to be disobeyed by the mobile device when the originating source is located outside of the zone by sending a blocking message to the mobile device, wherein said blocking message instructs the mobile device not to perform or accept the request.

7. The method as set forth in claim 6, steps (a) and (b) further including the steps of broadcasting within the zone a plurality of pings, wherein each ping is identifiable by and transmitted at a different channel, and detecting receipt of at least one ping by the mobile device, so as to determine the presence and communication channel of the mobile device.

8. The method as set forth in claim 6, wherein the mobile device detects the request, waits a predetermined period and determines whether a blocking message has been received, after detecting and prior to accepting the request, and accepts the request only when a blocking message has not been received during the period.

9. The method as set forth in claim 6; and (g) sending a report to a law enforcement agency, wherein the report informs the agency of the originating source location.

10. A method of controlling performance of specified wireless requests by a mobile device within an authorized zone, the method comprising the steps of:
    (a) determining the presence of the mobile device within the zone;
    (b) determining and storing at least one communication channel of the mobile device;
    (c) detecting only a wireless request having a transmission channel congruent with the communication channel;
    (d) determining the location of the originating source of the request; and
    (e) denying acceptance of the request by the mobile device when the originating source is located outside of the zone, by sending a blocking message to the mobile device, wherein said blocking message instructs the mobile device not to receive, accept, or perform the request.

11. The method as set forth in claim 10, steps (a) and (b) further including the steps of broadcasting within the zone a plurality of pings, wherein each ping is identifiable by and transmitted at a different channel, and detecting receipt of at least one ping by the mobile device, so as to determine the presence and communication channel of the mobile device.

12. The method as set forth in claim 10, wherein the mobile device detects the request, waits a predetermined period and determines whether a blocking message has been received, after detecting and prior to accepting the request, and accepts the request only when a blocking message has not been received during the period.

13. The method as set forth in claim 10; and (g) sending a report to a law enforcement agency, wherein the report informs the agency of the originating source location.

* * * * *